United States Patent [19]

Owen

[11] Patent Number: 5,608,970
[45] Date of Patent: Mar. 11, 1997

[54] QUICK RELEASE TRUSS CLAMP AND METHOD

[75] Inventor: Reginald J. Owen, Warrnambool, Australia

[73] Assignee: Mount Shamrock Pty Ltd., Victoria, Australia

[21] Appl. No.: 530,455

[22] Filed: Sep. 19, 1995

[51] Int. Cl.⁶ .................................................. B30B 3/02
[52] U.S. Cl. .................. 29/897.31; 29/559; 29/281.3; 269/37; 269/910; 269/303; 269/304; 269/99
[58] Field of Search ................................ 269/37, 43, 40, 269/303, 304, 910, 99; 29/281.1, 281.3, 897.31, 559; 227/152, 154, 155; 100/913, 295, 100

[56] References Cited

U.S. PATENT DOCUMENTS

| | | | |
|---|---|---|---|
| 169,516 | 11/1875 | Brainard | 269/243 |
| 486,228 | 11/1892 | Ilbery | 269/243 |
| 1,033,758 | 7/1912 | Howell | 269/99 |
| 1,401,444 | 12/1921 | Roberts | 269/99 |
| 1,820,667 | 8/1931 | Leyers | 269/243 |
| 1,850,338 | 3/1932 | Abegg | 269/243 |
| 3,596,898 | 8/1971 | Hilburn | 269/243 |
| 5,342,030 | 8/1994 | Taylor | 269/910 |

Primary Examiner—Robert C. Watson
Attorney, Agent, or Firm—Lowe, Price, LeBlanc & Becker

[57] ABSTRACT

A quick release clamp for clamping relative to a member is provided as well as a method of locating frame members of a roof truss frame on a roof truss frame table to permit fabrication of roof truss frames. The clamp has a moveable clamping jaw, a threaded clamping shaft, and a threaded clamping nut. The jaw is attached to one end of the shaft so that it can rotate with the shaft when the shaft is rotated. The shaft has a stop at the opposite end to the jaw. The nut is screw-threadably attached to the shaft between the jaw and the stop. The jaw is arranged to pass through an aperture in a member to which the clamp is to be attached. The aperture may in fact comprise a slot in a track member. The jaw and the aperture are shaped so that in one angular rotated position of the jaw relative to the aperture the jaw can pass through the aperture but in another angular rotated position relative to the aperture the jaw cannot pass through the aperture. The nut is of a size which will span the aperture so that when the nut is tightened with the jaw being in place through the aperture and spanning the aperture, clamping can be effected. The clamp permits quick release by untightening the nut. In this case, the jaw is moved away from the member to which it is clamped as the nut threadably moves on the shaft. When the nut engages the stop the shaft will be rotated with the nut and thereby rotate the jaw angularly so that it can be drawn through the aperture so that the clamp can then be removed from the member. The clamp can be used as an engagement surface for locating the position of frame members in a roof truss frame on a roof truss frame table used for fabricating the roof truss.

8 Claims, 3 Drawing Sheets

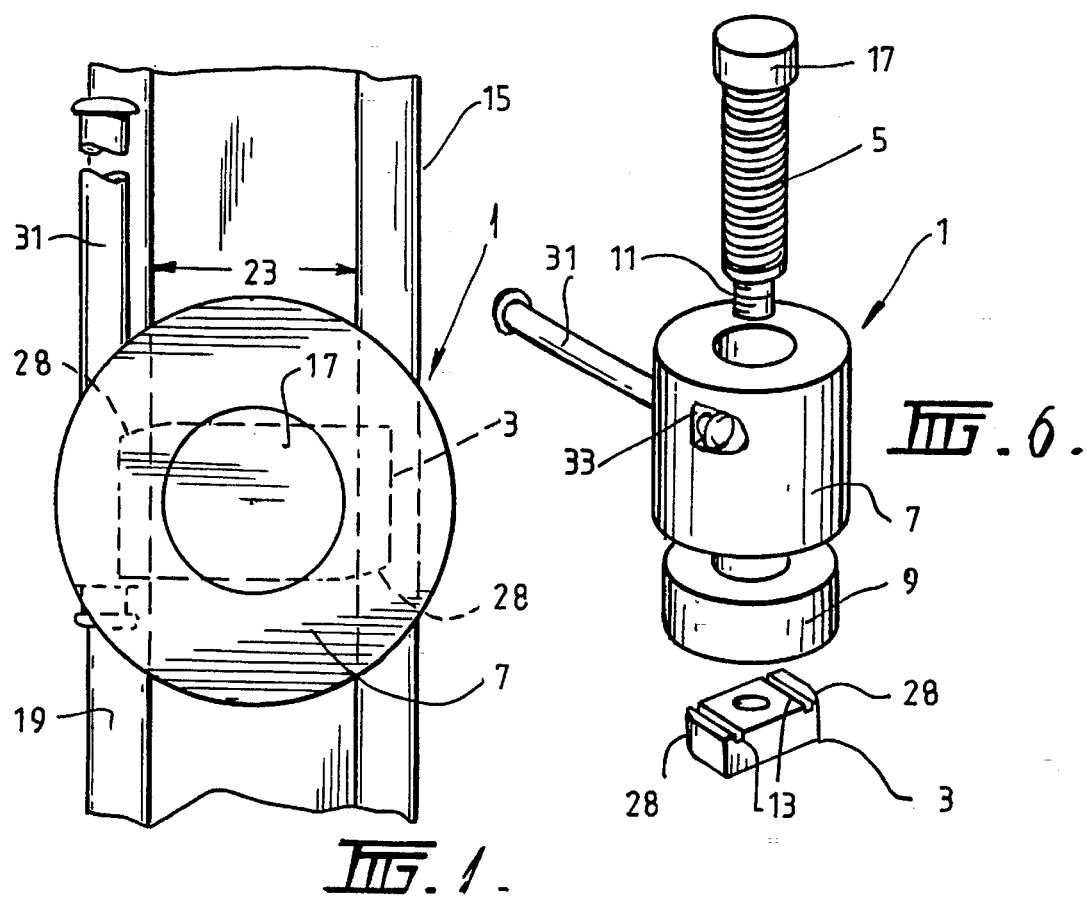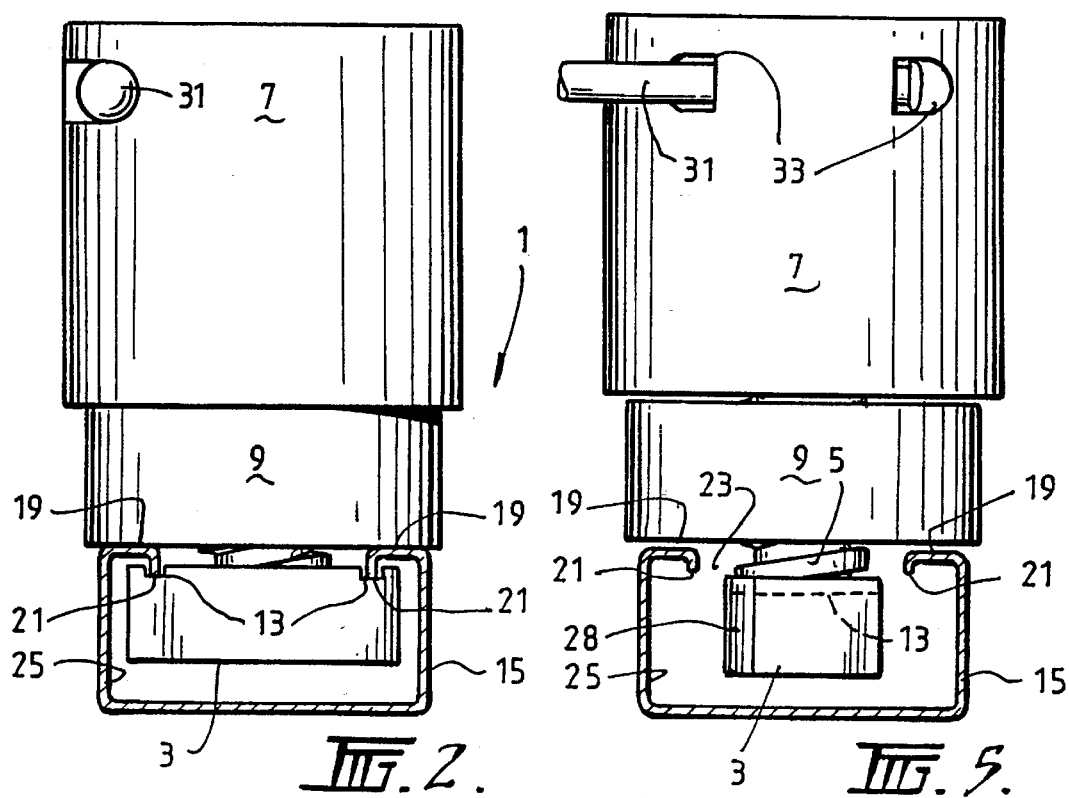

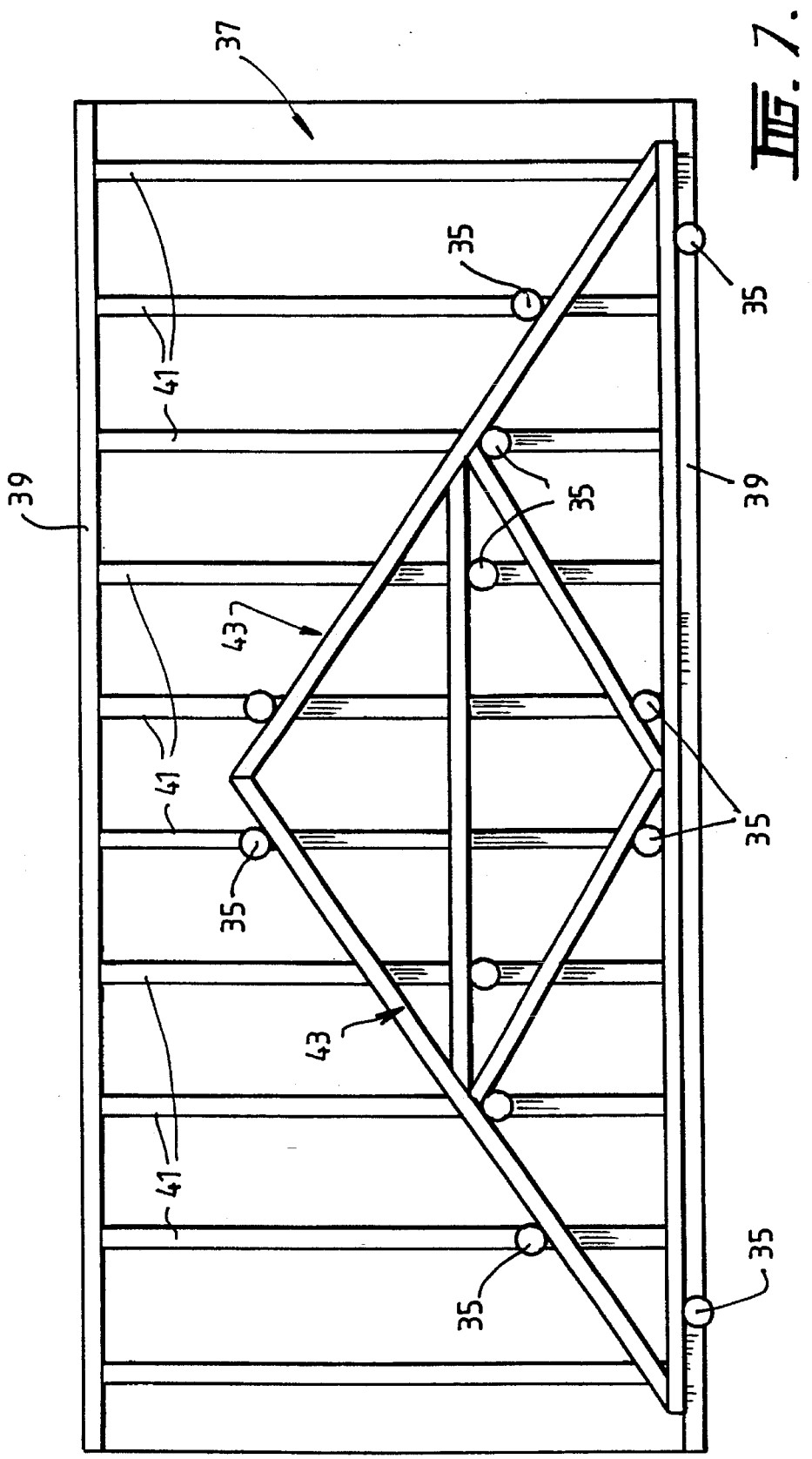

QUICK RELEASE TRUSS CLAMP AND METHOD

This invention relates to a quick release clamp for clamping relative to a member and relates particularly, but not exclusively, to such for use in the fabrication of roof truss frames on a roof truss frame table. In this case, the clamp can act as a bobbin for locating the frame members of the roof truss frame prior to interconnection of the frame members with one another.

Hitherto, in the truss frame arts, it has been common to provide a roof truss frame table to which is attached bobbins which locate roof truss frame members to correctly position the roof truss frame members relative to one another prior to interconnection of the truss frame members by suitable interconnecting means. In one application, the truss frame members can be interconnected with a plate nail system known by the trade name GANGNAIL. Other interconnection systems can be utilised. Generally, there is a need to provide bobbin means with quick releasing facilities to enable the quick re-assembly of bobbins into correct positions on a roof truss frame table for production of a different size or shape roof truss frames. In the past, such bobbins have been mounted by a screw-threaded nut arrangement into tracks. The clamping and unclamping of the bobbins has been quite time consuming and the present invention is directed to providing a quick release clamp which in one embodiment has particular application in the roof truss frame building art.

Therefore according to a first broad aspect of the present invention there is provided a quick release clamp for clamping relative to a member, said member having a first surface and a second surface and wherein an aperture extends through said member between said first surface and said second surface, said clamp having:

(a) a moveable clamping jaw
(b) a threaded clamping shaft
(c) a threaded clamping nut said jaw being attached to one end of said shaft so that it will rotate with said shaft as said shaft is rotated, said shaft having a stop at the opposite end to said one end, said nut being screw threadably attached to said shaft between said one end and said opposite end, said jaw and said aperture being shaped so that in one angular rotated position of said jaw relative to said aperture it can pass through said aperture but in another angular rotated position relative to said aperture it cannot pass through said aperture, said clamp being such that said nut is of a size which will span said aperture, and so said nut will bear into engagement with said first surface when said shaft extends through said aperture and said jaw is situated adjacent said second surface with said first and said second surfaces being between said nut and said jaw, said clamp permitting clamping to said member by said jaw being screw threadably moved into engagement with said second surface on tightening said nut towards said jaw whereby clamping is effected as said nut bears into tightened engagement with said first surface, said clamp permitting quick release by untightening said nut whereby said jaw is moved away from said second surface and so that when said nut engages said stop said jaw will be free of said second surface to angularly rotate with said shaft as said shaft is further rotated whereby said nut can be moved to an angularly rotated position where said jaw can be drawn through said aperture so said clamp can then be removed from said member.

In accordance with a further aspect of the present invention there is provided a method of locating frame members of a roof truss frame on a roof truss frame table for fabrication of roof truss frames of different sizes, said roof truss frame table having track members in the upper surface thereof to which bobbin locaters can be secured at desired locations, said track members each having a first surface on a top face of said table and a second surface within said track and a track slot extending into said track member between said first surface and said second surface, said bobbin having:

(a) a moveable clamping jaw
(b) a threaded clamping shaft
(c) a threaded clamping nut said jaw being attached to one end of said shaft so that it will rotate with said shaft as said shaft is rotated, said shaft having a stop at the opposite end to said one end, said nut being screw threadably attached to said shaft between said one ends and said opposite end, said jaw and said aperture being shaped so that in one angular rotated position of said jaw relative to said track slot it can pass through said track slot but in another angular rotated position relative to said track slot it cannot be withdrawn through said track slot, said bobbin being such that said nut is of a size which will span said track slot, and so said nut will bear into engagement with said first surface when said shaft extends through said track slot and said jaw is situated adjacent said second surface with said first and said second surfaces being between said nut and said jaw, said bobbin permitting clamping to said track members by said jaw being screw threadably moved into engagement with said second surface on tightening said nut towards said jaw whereby clamping is effected as said nut bears into tightened engagement with said first surface, said bobbin permitting quick release by untightening said nut whereby said jaw is moved away from said second surface and so that when said nut engages said stop said jaw will be free of said second surface to angularly rotate with said shaft as said shaft is further rotated whereby said nut can be moved to an angularly rotated position where said jaw can be drawn through said track slot so said clamp can then be removed from said member, said method comprising clamping a plurality of said bobbins to said track members at desired locations to locate said roof frame members for construction of a roof truss frame of one size by said nut acting as a stop surface for locating at least one of said frame members, assembling the roof truss frame, and subsequently removing said bobbins from said track members and relocating said bobbins at different positions to said track members and effecting clamping of said bobbins at said different positions to permit construction of a roof truss frame of another size.

In order that the invention can be more clearly ascertained an example of a preferred embodiment will now be described with reference to the accompanying drawings, wherein:

FIG. 1 shows a plan view of a quick release clamp in the form of a bobbin attached to a track;

FIG. 2 is an end elevation of the clamp shown in FIG. 1;

FIG. 5 is a view similar to that of FIG. 4 but showing jaws of the clamp angularly rotated to permit withdrawal from the track;

FIG. 6 is an exploded perspective view showing the components of the clamp; and

FIG. 7 is a plan view of a roof truss frame table having a series of bobbins which can be adjustably positioned on tracks formed on the table.

Figure 4:
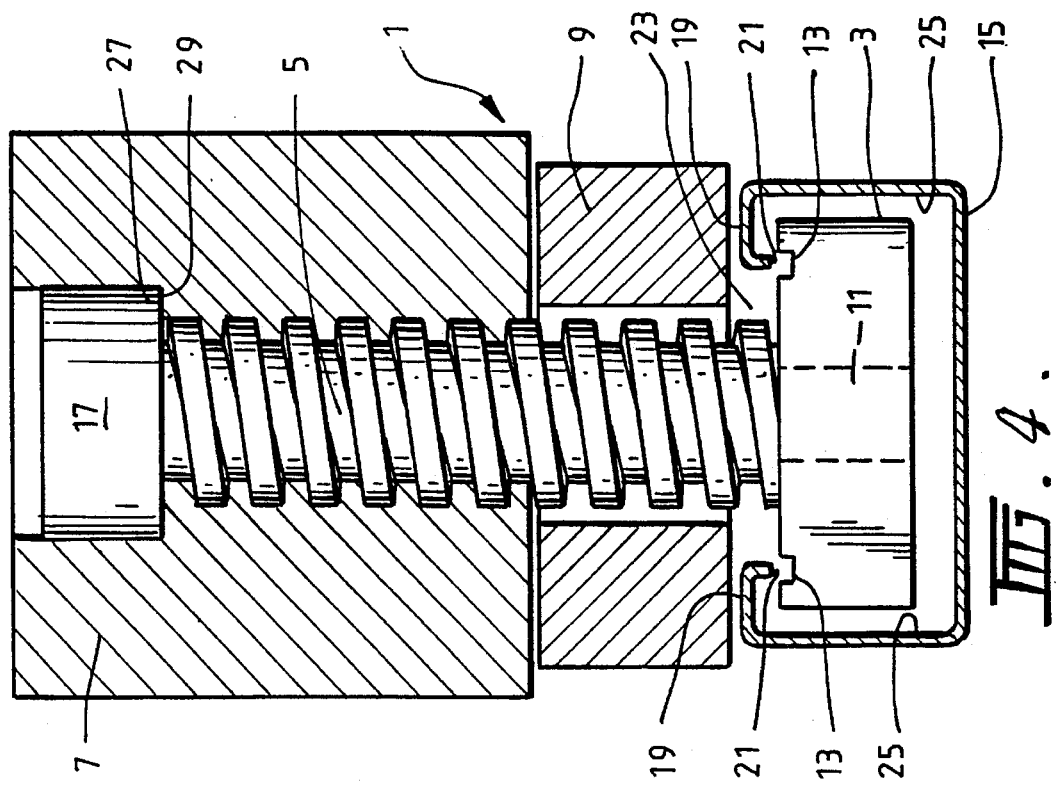
FIG. 4 is a transverse cross-sectional view similar to that shown in FIG. 3 but showing the clamp in an unclamped condition.

Referring now to FIGS. 1 through 6 generally, it can be seen that the quick release clamp 1 is suitably shaped to provide a bobbin as will hereinafter be explained in relation to FIG. 7. The clamp 1 has a moveable clamping jaw 3 which is of generally elongate rectangular shape as clearly shown by FIG. 6. The jaw 3 is, in turn, attached to one end of a threaded clamping shaft 5 so that it will rotate with the shaft 5 as the shaft 5 is rotated. The threaded clamping shaft 5, in turn, carries a threaded clamping nut 7. A washer 9 is preferably provided between the nut 7 and the jaw 3.

Accordingly, it can be seen that the jaw 3 may be attached to the shaft 5 by means of a screw-threaded connection part 11 at one end of the shaft 5. Typically, the nut 3 is screw-threaded onto the part 11 and held thereto in tightened screw-threaded engagement by means of a lock tight or similar fastening medium. Typically, the jaws 3 are of hardened steel and have machined grooves 13 therein to locate with surfaces on a member such as at track 15. This will be explained in detail in due course. The nut 7 is screw-threaded onto the shaft 5 between a stop 17 and the jaw 3. In the present embodiment, the stop 17 comprises a head of the shaft 5. The member or track 15 has a first surface 19 and a second surface 21. The member or track 15 has an aperture 23 which extends through the member between the first surface 19 and the second surface 21. In this embodiment, the aperture comprises a slot 23 in the track 15. In FIG. 1, the slot 23 has been shown with a width indicated by the arrowed line. Thus, in one angular rotated position of the jaw 3 relative to the aperture 23, the jaw 3 can pass through the aperture 23 (see FIG. 5) but in another angular rotate position relative to the aperture 23, the jaw 3 cannot pass through the aperture 23 (see FIGS. 2, 3 and 4). In this latter position, the grooves 13 are aligned to locate with the second surfaces 21.

The figures clearly show that the nut 7 is of a size which will span the aperture 23. The nut 7 is arranged so that it will bear into engagement with the first surface 19 when the clamp is tightened. This will be explained in due course. In this instance, however, the nut 7 bears on the washer 9 and the washer 9, in turn, bears on the first surface 19, but the effect is that the nut 7 bears into engagement with the first surface 19. The washer 9 is provided as a suitable spacer means as will be described hereinafter.

The clamp 1 is arranged into an unlocked condition as shown by FIG. 5 so that the jaw 3 can pass through the aperture 23. This locates the clamp relative to the track 15. The nut 7 is then angularly rotated clockwise, as a right-handed thread is provided on the threaded shaft 5, and this, in turn, causes the nut 3 to rotate within the track 15 under the second surfaces 23 to assume a position as shown in FIG. 4. In other words, the grooves 13 are aligned relative to the second surfaces 21.

As the nut 7 is further rotated in a clockwise direction, the nut 7 engages with the internal side walls 25 of the track 17 (see FIG. 4) and resists further angular rotation of the jaw 3. Throughout the figures, the jaw 3 has been shown diagrammatically only and is therefore shown of smaller dimension than would normally be provided to effect engagement with the internal side walls 25. The leading edge of the nut 3 is angularly bevelled to assist such swinging as shown in FIG. 6 and FIG. 1. This, in turn, allows the jaw 3 to rotate initially but to lock against the internal side walls 25 when the larger radially outwardly directed regions 27 engage with the side walls 25.

Figure 3:
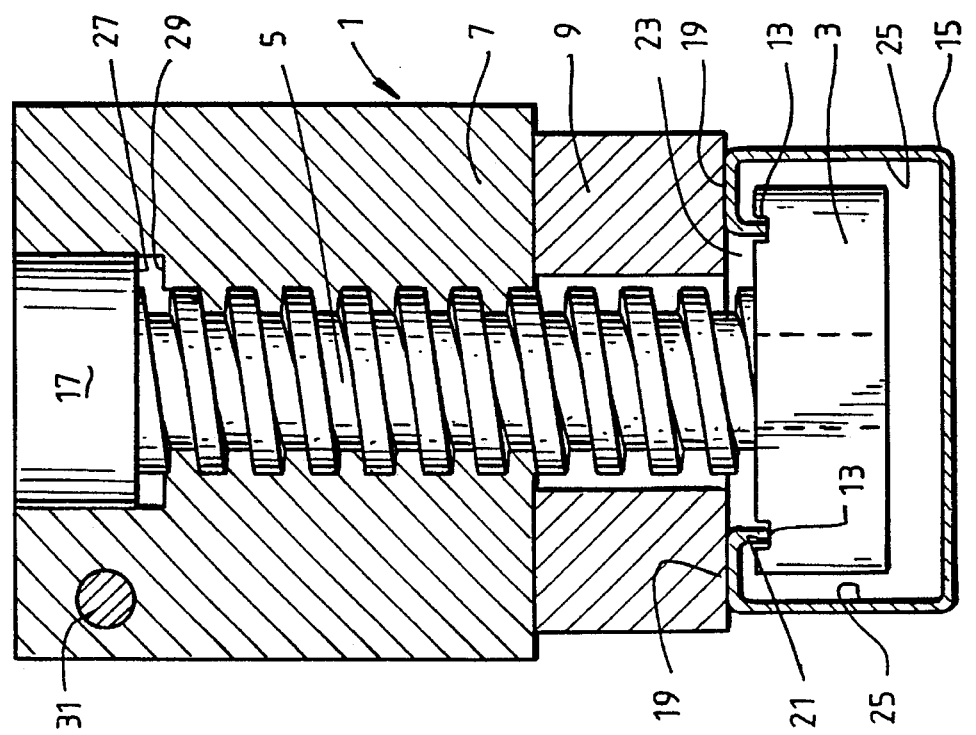
FIG. 3 is a transverse cross-sectional view of the clamp shown in FIG. 1.

On further rotation of the nut 7 in a clockwise direction, the nut 7 moves towards the first surface 19. This, in turn, draws the jaw 3 towards the second surfaces 21 and locates the second surfaces 21 within the grooves 13. Final clamping is effected when the nut 7 is unable to be rotated further in a clockwise direction. FIGS. 2 and 3 show this clamped arrangement. It should be noted from FIG. 3 that the under surface of the stop 17 is spaced slightly from the upper surface 29 of the nut 7. Conveniently, the stop 17 is provided in a recess at the top of the nut 7 and therefore the top surface 29 in this instance is the innermost surface of the recess.

In order to release the clamp, the nut 7 is rotated in an anti-clockwise direction. In this condition, the nut 7 moves so that the top surface 29 engages with the under surface 27 of the stop 17. This is shown in FIG. 4. On further rotation of the nut 7, the shaft 5, in turn, then turns with the nut 7 because of the engagement of the nut 7 with the stop 17. Accordingly, just prior to the nut 7 positively engaging with the stop 17, the jaw 3 is able to move away from the second surfaces 21 as shown in FIG. 4. Continued anti-clockwise rotation of the nut 7 then turns the Saw 3 to a position shown in FIG. 5. In this position, the clamp 1 can be withdrawn from the member or track 15 as the jaw 3 will then pass through the aperture 23.

A suitable handle 31 may be provided on the nut 7 to facilitate angular rotation of the nut 7. Conveniently, the handle 31 may have penned heads so that it can be held relative to the nut 7 but can slide along its own length to assume desired positions. It is also preferred that when in an extreme end position as shown in FIG. 1 and FIG. 5 that the peaned head at one end is within a cavity 33 in a side edge of the nut 7, thereby leaving the outer surface of the nut 7 free of any projection at that particular region. Thus, in the case where the clamp is used as a bobbin as will hereinafter be described, the handle 31 may be slid to an end as shown in FIGS. 1 and 5 so that the handle 31 does not protrude from the outer surface of the nut 7 to interfere with positioning or location of strut members which may bear against the outer surface of the nut 7.

Typically, the washer 9 is provided to be of a thickness which will marginally space the upper surface of the jaw 3 from the under surface of the second surface 23 when the nut 7 initially engages with the stop 17. This, in turn, will limit the amount of angular rotation required of the nut 7 to effect positive clamping engagement. Typically, the thread of the shaft 5 and the nut 7 are suitably chosen so that angular rotation of about 90° will effect locking and unlocking of the clamp relative to the member 15. If desired, the washer 9 may be dispensed with so that the nut 7 actually engages directly on the first surface 19. It has been found however that a washer 9 is preferred as it can be used to correct for any small tolerance differences, particularly if shimwashers 9 are collectively added to provide a required spacing thickness.

Accordingly, it should be appreciated that the nut 7 will bear into engagement with the first surface 19 when the shaft 5 extends through the aperture 23 and the jaw 3 is situated adjacent the second surface 21 with the first surface 19 and the second surface 23 being between the nut 7 and the jaw 3. Clamping is effected to the member or track 15 by the jaw 3 being screw threadably moved into engagement with the second surface 23 on tightening of the nut 7 towards the jaw 3. In this case clamping is effected as the nut 7 bears into tightened engagement with the first surface 19. The clamp permits quick release by untightening the nut 7 whereby the jaw 3 is moved away from the second surface 23. In this case, when the nut 7 engages the stop 17 the jaw 3 will be free of the second surface 21 to angularly rotate with the shaft 5 as the shaft 5 is further rotated whereby the nut 7 can be moved to an angularly rotated position where the jaw 3 can be drawn through the aperture 23 so that the clamp 1 can then be removed from the member or track 15.

It should also be noted that the jaw 3 and the aperture 23 are shaped so that in one angularly rotated position of the jaw 3 relative to the aperture 23 it can pass through the aperture 23, but in another angular rotated position (in this case 90° relative to the aperture 23) it cannot pass through the aperture 23.

Referring now to the embodiment shown in FIG. 7, there is depicted a plan view of a roof truss frame table having a series of bobbins 35 held thereto in clamping engagement therewith at various positions. The roof truss frame table 37 is generally a planar table with a series of tracks 39 and 41 integrally formed thereon so that the upper surfaces of the tracks 39 and 41 are flush with the upper surface of the table 37. The tracks 39 and 41 are conveniently of the same shape as the member/tracks 15 shown in FIGS. 1 through 6 and wherein the aperture 23 or slot is uppermost. The table 37 is a known table per se. The bobbins comprising the clamp shown in FIGS. 1 through 6 are then positioned on the tracks 39, 41 at desired positions so that roof frame members 43 can be correctly positioned for one size roof truss frame by engaging with the external cylindrical side surface of the nut. In this case the surface of the nut comprises an engagement surface for the roof frame members 43. The roof truss frame members 43 can then be interconnected together with suitable fastening means which, in one embodiment might comprise fastening means sold under the trade name GANGNAIL. In this case, GANGNAIL plates are provided underneath the interconnection of the roof frame members 43 and similar GANGNAIL plates provided on the upper corresponding regions. A press is then applied to the plates to, in turn, interconnect the roof frame members 43. Conveniently, the height of the upstanding portion of the bobbins is arranged to be below the upper surface of the wooden roof frame members 43. In this way, a press is able to cooperate with the interconnecting plates without fouling with the upper surface of the bobbins 35.

When a different sized roof truss or different truss strut arrangements are required, it is merely necessary to reposition the bobbins 35 in the required new positions and provide roof frame members 43 of appropriate lengths. The quick release clamp provided in the example of the preferred embodiment enables for quick clamping and unclamping of the bobbins 35 relative to the tracks 39 and 41 and permits rapid changing of layout requirements for different size and configured roof truss frames. In the past, the bobbins 35 have required to be manually unscrewed by spanners as they comprise a simple bolt and nut arrangement, i.e. the bolt being the shaft 5 with the jaws 3 attached thereto and wherein the nut 7 merely is operated to clamp the bobbins relative to the members or track 15.

Whilst the bobbins 35 have been shown at various locations on the tracks 39 and 41, it should be appreciated that the bobbins 35 may have other brackets or guides attached thereto to assist in the correct holding and positioning of the roof frame members 43 and that in this case the same quick release mechanism of the bobbins 35 employed. FIG. 7 is therefore somewhat diagrammatic in merely showing the general layout of the roof truss frame table.

Modifications may be made to the present invention as would be apparent to persons skilled in the tool making/clamp/bobbin arts and all such modifications are deemed within the scope of the present invention.

These and other modifications may be made without departing from the ambit of the invention, the nature of which is to be determined from the foregoing description.

I claim:

1. quick release clamp for clamping relative to a member, said member having a first surface and a second surface and wherein an aperture extends through said member between said first surface and said second surface, said clamp having:

(a) a moveable clamping jaw
   (b) a threaded clamping shaft
   (c) a threaded clamping nut said jaw being attached to one end of said shaft so that it will rotate with said shaft as said shaft is rotated, said shaft having a stop at the opposite end to said one end, said nut being screw threadably attached to said shaft between said one end and said opposite end, said jaw and said aperture being shaped so that in one angular rotated position of said jaw relative to said aperture said jaw can pass through said aperture but in another angular rotated position relative to said aperture said jaw cannot pass through said aperture, said clamp being such that said nut is of a size which will span said aperture, and so said nut will bear into engagement with said first surface when said shaft extends through said aperture and said jaw is situated adjacent said second surface with said first and said second surfaces being between said nut and said jaw, said clamp permitting clamping to said member by said jaw being screw threadably moved into engagement with said second surface on tightening said nut towards said jaw whereby clamping is effected as said nut bears into tightened engagement with said first surface, said clamp permitting quick release by untightening said nut whereby said jaw is moved away from said second surface and so that when said nut engages said stop said jaw will be free of said second surface to angularly rotate with said shaft as said shaft is further rotated whereby said nut can be moved to an angularly rotated position where said jaw can be drawn through said aperture so said clamp can then be removed from said member.

2. A clamp as claimed in claim 1 wherein said jaw is screw threadably attached to said one end of said shaft.

3. A clamp as claimed in claim 1 wherein a washer is provided on said shaft between said nut and said jaw for, in use, bearing directly into engagement on said first surface and wherein said nut bears directly into engagement with said washer.

4. A clamp as claimed in claim 3 wherein said washer is of a thickness so that, in use, rotation of said nut through approximately 90° will effect clamping and unclamping to permit said jaw to be drawn through said aperture.

5. A clamp as claimed in claim 1 wherein said nut is provided with a handle for assisting rotation of said nut.

6. A clamp as claimed in claim 5 wherein said handle is elongate and can slide relative to said nut along its length and wherein at one extreme end position of sliding the end of said handle at that end is within the perimeter of said nut.

7. A clamp as claimed in claim 6 wherein said nut is cylindrical and said clamp is useable as a bobbin on a roof truss frame table and wherein said nut is useable as an engagement surface for roof truss frame members to correctly position those frame members for assembly of a roof truss.

8. A method of locating frame members of a roof truss frame on a roof truss frame table for fabrication of roof truss frames of different sizes, said roof truss frame table having track members in the upper surface thereof to which bobbin locaters can be secured at desired locations, said track members each having a first surface on a top face of said table and a second surface within said track and a track slot extending into said track member between said first surface and said second surface, said bobbin having:

(a) a moveable clamping jaw (b) a threaded clamping shaft (c) a threaded clamping nut said jaw being attached to one end of said shaft so that it will rotate with said shaft as said shaft is rotated, said shaft having a stop at the opposite end to said one end, said nut being screw threadably attached to said shaft between said one ends and said opposite end, said jaw and said aperture being shaped so that in one angular rotated position of said jaw relative to said track slot it can pass through said track slot but in another angular rotated position relative to said track slot it cannot be withdrawn through said track slot, said bobbin being such that said nut is of a size which will span said track slot, and so said nut will bear into engagement with said first surface when said shaft extends through said track slot and said jaw is situated adjacent said second surface with said first and said second surfaces being between said nut and said jaw, said bobbin permitting clamping to said track members by said jaw being screw threadably moved into engagement with said second surface on tightening said nut towards said jaw whereby clamping is effected as said nut bears into tightened engagement with said first surface, said bobbin permitting quick release by untightening said nut whereby said jaw is moved away from said second surface and so that when said nut engages said stop said jaw will be free of said second surface to angularly rotate with said shaft as said shaft is further rotated whereby said nut can be moved to an angularly rotated position where said jaw can be drawn through said track slot so said clamp can then be removed from said member, said method comprising clamping a plurality of said bobbins to said track members at desired locations to locate said roof frame members for construction of a roof truss frame of one size by said nut acting as a stop surface for locating at least one of said frame members, assembling the roof truss frame, and subsequently removing said bobbins from said track members and relocating said bobbins at different positions to said track members and effecting clamping of said bobbins at said different positions to permit construction of a roof truss frame of another size.

* * * * *